US010751595B2

(12) United States Patent
Arveras García

(10) Patent No.: US 10,751,595 B2
(45) Date of Patent: Aug. 25, 2020

(54) ACCESSORY FOR SECURING POINTS D'ARRET ON FENCING ÉPÉES

(71) Applicant: Ricardo Arveras García, Barcelona (ES)

(72) Inventor: Ricardo Arveras García, Barcelona (ES)

( * ) Notice: Subject to any disclaimer, the term of this patent is extended or adjusted under 35 U.S.C. 154(b) by 0 days.

(21) Appl. No.: 14/360,637

(22) PCT Filed: Nov. 23, 2012

(86) PCT No.: PCT/ES2012/070822
§ 371 (c)(1),
(2) Date: May 26, 2014

(87) PCT Pub. No.: WO2013/076343
PCT Pub. Date: May 30, 2013

(65) Prior Publication Data

US 2015/0283446 A1 Oct. 8, 2015

(30) Foreign Application Priority Data

Nov. 25, 2011 (ES) .................................. 201131905

(51) Int. Cl.

| | |
|---|---|
| ***A63B 69/02*** | (2006.01) |
| ***B25B 15/00*** | (2006.01) |
| ***F16B 23/00*** | (2006.01) |
| ***F41B 13/02*** | (2006.01) |
| ***F16B 35/00*** | (2006.01) |

(52) U.S. Cl.
CPC ............ *A63B 69/02* (2013.01); *B25B 15/001* (2013.01); *F16B 23/0023* (2013.01); *F16B 35/005* (2013.01); *F41B 13/02* (2013.01)

(58) Field of Classification Search
CPC .... B25B 15/001; F16B 23/0023; A63B 69/02
USPC ............................... 81/436–456; 7/138, 165
See application file for complete search history.

(56) References Cited

U.S. PATENT DOCUMENTS

| | | | | |
|---|---|---|---|---|
| 1,300,275 A * | 4/1919 | Johnson | B25B 13/48 | 301/11.2 |
| 2,800,936 A * | 7/1957 | West | B25B 15/005 | 81/460 |
| 3,129,742 A * | 4/1964 | Gunther | F16B 39/04 | 411/213 |
| 3,167,105 A * | 1/1965 | Rosan | F16B 39/286 | 411/121 |

(Continued)

*Primary Examiner* — Brian D Keller
(74) *Attorney, Agent, or Firm* — Hoglund & Pamias, PSC; Roberto J. Rios

(57) ABSTRACT

The invention relates to an accessory for securing points d'arrêt on fencing épées, comprising a screw for securing the point d'arrêt which is located on the tip of a fencing épée, in order to close the circuit of the electric touch-detection device with which said swords are equipped. The invention includes a screw-coupling tool, characterised in that the screw includes a central axially-extending through-hole having a hexagonal or any other prism-shaped configuration, while the actuation end of the tool includes a first cylindrical or frustoconical segment so that it can be easily fitted to the hole in the screw. In addition, a collar is provided half-way along the length or height of the screw, which serves as an end-stop element.

4 Claims, 1 Drawing Sheet

7 5 6 8

(56) References Cited

U.S. PATENT DOCUMENTS

| | | | | |
|---|---|---|---|---|
| 3,673,912 | A * | 7/1972 | Herr | F16B 23/0076<br>411/403 |
| 3,888,144 | A * | 6/1975 | Parsons | B25B 15/004<br>411/403 |
| 4,269,088 | A * | 5/1981 | Dukes | B25B 23/0078<br>81/57.39 |
| 5,004,389 | A * | 4/1991 | Spinger | F16B 39/34<br>285/355 |
| D371,947 | S * | 7/1996 | Mellinger | D24/133 |
| 6,485,064 | B1 * | 11/2002 | Davidson | F16L 33/2071<br>285/256 |
| 6,507,313 | B1 * | 1/2003 | Rougas | H01Q 3/2605<br>342/368 |
| 7,028,592 | B2 * | 4/2006 | Hills | B25B 15/007<br>81/436 |
| 7,066,062 | B2 * | 6/2006 | Flesher | B25B 13/485<br>411/403 |
| 7,441,483 | B2 * | 10/2008 | Flesher | B25B 13/485<br>411/403 |
| 8,491,245 | B2 * | 7/2013 | Lin | F16B 35/00<br>411/325 |
| 2003/0209113 | A1 * | 11/2003 | Brooks | B25B 15/008<br>81/439 |
| 2010/0192736 | A1 * | 8/2010 | Burch | B25B 15/005<br>81/438 |

* cited by examiner

ACCESSORY FOR SECURING POINTS D'ARRET ON FENCING ÉPÉES

OBJECT OF THE INVENTION

The present invention refers to an accessory for securing points d'arrêt (stopping points) on electric fencing épées (swords), the accessory comprising a screw and corresponding tool for the actuation thereof.

The object of the invention is to provide a type of screw that enables a better fastening to the button or point of the sword, to avoid over-tightening, as well as a greater ease in applying and removing it from the button where it is fastened. The tool that accompanies it is coupled to the screw configuration with the purpose of applying the force couple in the most effective way.

Thus, the invention is situated in the field of accessories used in the sport of fencing.

BACKGROUND OF THE INVENTION

As it is known, in the sport of fencing, the sword weapon is provided with an electric device for detecting touches. The electric button is found situated on the point of the sword, part of which is a metallic casing that houses the stopping point. The aim of said point is the closure of the circuit of the electric device for detecting touches each time that it is subject to sufficient pressure on its flat frontal surface. Two guiding slots made in the casing of the electric button enable the stopping point to remain confined within certain limits of longitudinal movement, via two screws secured on the point.

These types of screw, because of the function they carry out, present a configuration (M2×0.25×2), with a straight slot head) that enables the securing of the body of the stopping point by means of a flat-head screwdriver and in this way maintain the stopping point confined in the casing of the electric button. This configuration has various problems.

- Risk of over-tightening in its mounting and the resulting boring of the insulating layer of the stopping point, since this is the under-layer that marks the travel stop of the screw and that, due to its lack of hardness, is passed through frequently when an excessive tightening torque is applied.
- Risk of screw loosening because of the mechanical vibrations caused by the practice of the sport, with the resulting loss of the point.
- Handling difficulty for the manual positioning and alignment of the screw with the threaded cavity in the point when inserting it. The small dimensions (mm) of the securing elements of the stopping point complicate its manipulation in the methods associated with the setting, checking and repositioning of the point for users with intermediate experience.
- Loss of the screw slot due to wear and the resulting blocking of the screw in the point d'arrêt.

DESCRIPTION OF THE INVENTION

The accessory that the invention proposes fully resolves the problems previously described in a satisfactory manner. For this purpose, it presents a configuration that is based on a (M2×2×2) that incorporates, aligned with its longitudinal axis, a 0.9 mm hexagonal through-hole, as well as a straight slot applied transversally at each end. The configuration is completed with the incorporation of a collar halfway along the shank thereof.

More specifically, the accessory of the invention, based on the conventional structure of the M2 type screws, focuses its characteristics on the fact that the hexagonal through-hole enables the use of keys with a hexagonal cross-section, whilst the two transversal ends slots enable the use of flat-headed screwdrivers. Both ends of the screw of the invention enable the application of hexagonal keys and head screwdrivers. With the purpose of avoiding the undesired effects of over-tightening, the collar situated halfway along the screw acts as a stop against the metallic body of the stopping point when screwed into the threaded opening made.

The screwdriver in which the tool is embodied that forms part of the accessory, enables the mixed configuration of the slot and hexagonal screw opening to be 100% coupled. This enables a high efficiency in the transmission of the tool torque to the screw, in a balanced and distributed way along the entire screw. This makes it easier for the screws to suffer less wear when it comes to being placed and for them to last longer than the conventional ones.

The end of the tool ends in a final section with a cylindrical configuration, with a diameter significantly smaller or equal to that of the passage of the hexagonal section, which helps the correct placement of the implement for its use.

DESCRIPTION OF THE DRAWINGS

To complement the description carried out and with the object of aiding a better understanding of the characteristics of the invention, according to an example of a practical preferred embodiment thereof, a set of drawings accompany as an integrated part of said description in which, with an illustrative and non-limiting character, the following has been represented.

PREFERRED EMBODIMENT OF THE INVENTION

Figure 1:
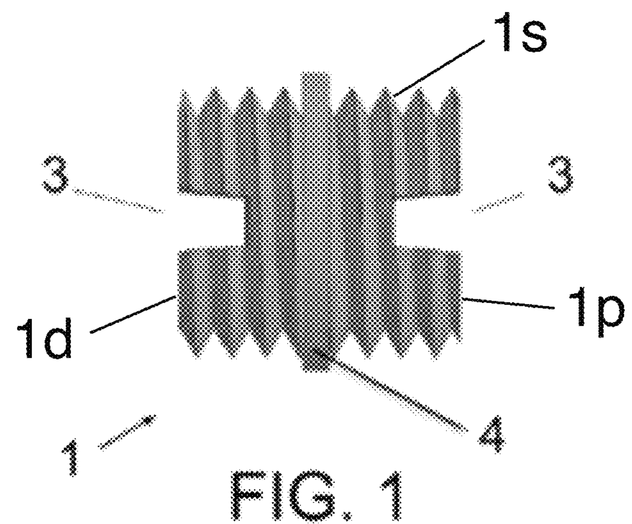
FIG. 1.—Shows a side elevation view of the screw that forms part of the accessory carried out according to the object of the present invention.
Figure 2:
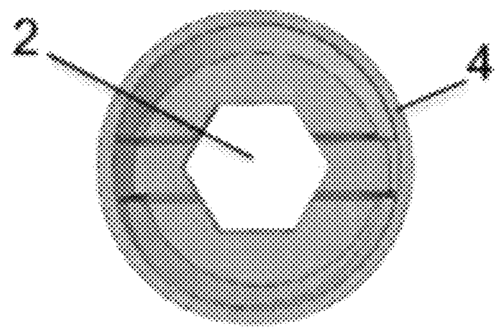
FIG. 2.—Shows a frontal elevation view of the screw represented in the previous figure.

As may be seen in the aforementioned figures, the accessory of the invention comprises a screw (1) having an external threaded surface (1*s*) longitudinally extending between a distal end (1*d*) and a proximal end (1*p*) of the screw (1) and a tool (8) to actuate the same, a screw (1) that is provided with a hole or hexagonal passage (2), which is axial and longitudinal, whilst each end have a transversal slot (3), all of this in such a way that two sections that are delimited by an intermediate collar (4), which is provided on the external threaded surface (1*s*) halfway along the length between the distal end (1*d*) and proximal end (1*p*) of said screw (1), are established on the screw, in such a way that the screw constituted in this way may be actuated by a tool that may be embodied as a screwdriver with a hexagonal head for its insertion into the hole (2) and actuate the corresponding screw (1), equally being possible its actuation by the same tool (8) that has, before the hexagonal section (5) of such a tool (8), a flat section (6) determining a screwdriver, which makes it possible to actuate the screw via the tool or screwdriver (2) by means of the hexagonal (5) and flat (6) sections that have just been mentioned.

The end of the tool (8) ends via a cylindrical section (7) with a diameter significantly smaller or equal to that of the passage of the hexagonal tool (5) section that helps the correct positioning of the assembly. This cylindrical section (7) may have a truncated cone configuration for greater ability in the moment of inserting the tool assembly into the screw (1) hole.

For its part, the intermediate collar (4) acts as a stop in the tightening of the screw (1) to carry out the securing of the stopping point in a fencing sword, all of this in such a way that the screw (1) in question supports the use of the aforementioned manual tool (8) and with a mixed configuration, i.e., with a hexagonal section (5) for hexagonal openings (2) and a flat section (6) for the transversal and flat slots (3) intended at the ends.

When the aforementioned tool (8) is actuated on the screw (1) it distributes the force of the tightening torque applied while adjusting the screw (1), in a balanced and safe way for the integrity of said screw, with the particular feature that the collar (4) that acts as a stop avoids the undesired effects of over-tightening on the stopping point that is being secured.

Figure 3:
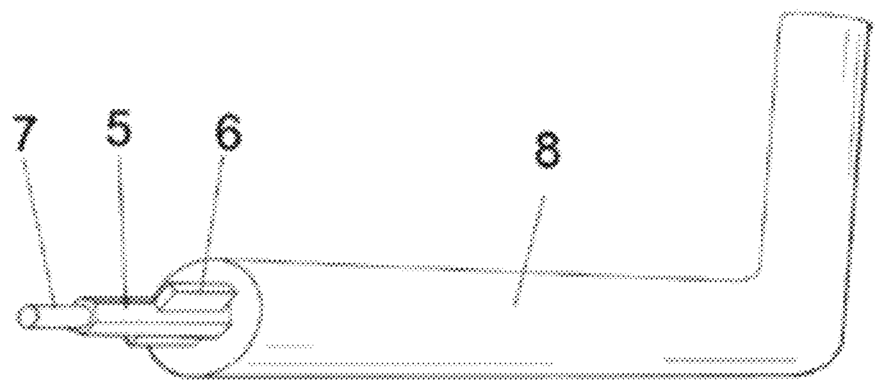
FIG. 3.—Shows a perspective view of the screwdriver embodying the tool, as part of the accessory object of the invention.

The screw (1) hole (2) may be cylindrical, square or any other prismatic configuration, this being complementary to the tool in FIG. 3 with regard to the section (5).

In addition to the aforementioned advantages, i.e., the high efficiency in the transmission of the tightening tool torque on the screw, in a balanced and distributed way along its entire length, it is also possible that the screw itself suffers less wear when it comes to being placed and that it lasts longer than the conventional ones.

The invention claimed is:

1. Accessory for securing stopping points on fencing swords, which has a screw for securing a stopping point that is situated on a point of a fencing sword, with the purpose of closing a circuit of an electric device for detecting touches that said swords incorporate, said accessory comprising:

a screw with an external threaded surface longitudinally extending from a distal end to a proximal end of said screw, a through-hole in an axial and longitudinal direction of said screw and a distal transversal flat slot located at said distal end and a proximal transversal flat slot located at said proximal end, a collar provided on said external threaded surface halfway between the distal and proximal ends of said screw and configured to act as a stop against a metallic body of the stopping points of the fencing swords when tightening said screw; and a tool for actuating said screw having a proximal end with a handle extending perpendicular to a length of said tool and an actuating distal end with a flat surface perpendicular to the length of said tool, wherein a first inserting section having a uniform cross-section perpendicularly extends away from said flat surface and a second inserting section, having a diameter equal to or smaller than a diameter of said first inserting section, longitudinally and coaxially extends away from a distal end of said first inserting section and a flat section that transversally extends away from an exterior surface of only said first inserting section and configured to complementary mate with the transversal flat slots of said distal and proximal ends of said screw, wherein the first and the second inserting sections are inserted into said through-hole when said screw is actuated.

2. The accessory of claim 1, wherein the shape of the first inserting section of said tool is configured to complementary mate with the shape of the through-hole of said screw.

3. The accessory of claim 1, wherein said through-hole and said first inserting section have a hexagonal shape.

4. The accessory of claim 1, wherein said second inserting section has a cylindrical or truncated conical shape.

* * * * *